(12) United States Patent
Yang et al.

(10) Patent No.: US 12,191,962 B2
(45) Date of Patent: Jan. 7, 2025

(54) METHOD FOR BEAM FAILURE RECOVERY, METHOD FOR BEAM FAILURE HANDLING, TERMINAL, AND NETWORK-SIDE DEVICE

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 492 days.

(21) Appl. No.: 17/383,758

(22) Filed: Jul. 23, 2021

(65) Prior Publication Data

US 2021/0351834 A1 Nov. 11, 2021

Related U.S. Application Data

(63) Continuation of application No. PCT/CN2020/070079, filed on Jan. 2, 2020.

(30) Foreign Application Priority Data

Jan. 25, 2019 (CN) .......................... 201910075898.1

(51) Int. Cl.
*H04B 7/06* (2006.01)
*H04W 16/28* (2009.01)
(Continued)

(52) U.S. Cl.
CPC .......... *H04B 7/0695* (2013.01); *H04W 16/28* (2013.01); *H04W 72/046* (2013.01);
(Continued)

(58) Field of Classification Search
CPC H04B 7/0695; H04B 7/0413; H04B 7/06964; H04W 16/28; H04W 72/046;
(Continued)

(56) References Cited

U.S. PATENT DOCUMENTS 11,743,964 B2* 8/2023 Ahn ................... H04W 74/006
370/216
2016/0164657 A1 6/2016 Fan
(Continued)

FOREIGN PATENT DOCUMENTS

CN 108811092 A 11/2018
CN 108988978 A 12/2018
(Continued)

OTHER PUBLICATIONS

Wang, "Beam Failure Recovery Method and Device, Storage Medium User Equipment," English Machine Translation of Wang (CN 110896546 B), Clarivate Analytics, pp. 1-14 (Year: 2023).*
(Continued)

*Primary Examiner* — Kibrom T Hailu
*Assistant Examiner* — Kai Chang
(74) *Attorney, Agent, or Firm* — von Briesen & Roper, s.c.

(57) ABSTRACT

This disclosure provides a method for beam failure recovery, a method for beam failure handling, a terminal, and a network-side device. The method includes: obtaining N pieces of configuration information, where the N pieces of configuration information are applicable to different transmission and reception points TRPs, and the configuration information includes a parameter for beam failure recovery; and in a case that a beam failure event occurring on at least one TRP is determined, transmitting a beam failure recovery request based on the configuration information.

20 Claims, 3 Drawing Sheets

(51) Int. Cl.
  *H04W 72/044* (2023.01)
  *H04W 72/23* (2023.01)
  *H04W 76/19* (2018.01)
(52) U.S. Cl.
  CPC ....... *H04W 72/0466* (2013.01); *H04W 72/23* (2023.01); *H04W 76/19* (2018.02)
(58) Field of Classification Search
  CPC . H04W 72/0466; H04W 72/21; H04W 72/23; H04W 72/54; H04W 72/56; H04W 76/19; H04W 24/08; H04W 72/0457; H04W 72/1273; H04W 72/232; H04L 1/1812; H04L 5/0048
  See application file for complete search history.

(56) References Cited

U.S. PATENT DOCUMENTS

| | | | |
|---|---|---|---|
| 2018/0227899 A1 | 8/2018 | Yu | |
| 2018/0234960 A1 | 8/2018 | Nagaraja et al. | |
| 2018/0287860 A1 | 10/2018 | Xia | |
| 2018/0302889 A1* | 10/2018 | Guo | H04W 72/046 |
| 2019/0173740 A1* | 6/2019 | Zhang | H04L 41/0677 |
| 2019/0215863 A1* | 7/2019 | Kim | H04W 36/0044 |
| 2019/0372830 A1* | 12/2019 | Zhang | H04L 41/0894 |
| 2020/0099461 A1 | 3/2020 | Chen et al. | |
| 2020/0106510 A1 | 4/2020 | Song et al. | |
| 2020/0137801 A1 | 4/2020 | Chen et al. | |
| 2020/0323015 A1* | 10/2020 | Jia | H04W 28/06 |
| 2021/0014708 A1* | 1/2021 | Kim | H04W 72/046 |
| 2021/0176773 A1* | 6/2021 | Jiang | H04W 72/566 |
| 2021/0274404 A1* | 9/2021 | Koziol | H04W 36/0055 |
| 2021/0282168 A1 | 9/2021 | Matsumura et al. | |
| 2021/0289372 A1 | 9/2021 | Liu et al. | |
| 2021/0320764 A1* | 10/2021 | Gao | H04B 7/024 |
| 2022/0021495 A1* | 1/2022 | Zhang | H04L 5/0048 |
| 2023/0032501 A1* | 2/2023 | Li | H04B 7/0617 |
| 2023/0121938 A1* | 4/2023 | Zhou | H04W 72/23 375/347 |

FOREIGN PATENT DOCUMENTS

| | | | | |
|---|---|---|---|---|
| CN | 109076365 A | | 12/2018 | |
| CN | 109151869 A | | 1/2019 | |
| CN | 110896546 B | * | 4/2022 | ........... H04B 7/0404 |
| EP | 3855661 A1 | * | 7/2021 | ........... H04B 7/0695 |
| RU | 2631261 C2 | | 9/2017 | |
| WO | 2018227441 A1 | | 12/2018 | |
| WO | 2018237400 A1 | | 12/2018 | |
| WO | 2020012619 A1 | | 1/2020 | |

OTHER PUBLICATIONS

First Korean Office Action related to Application No. 10-2021-7026027; reported on Jan. 18, 2023.
R1-1809855—Source: NTT DOCOMO, Inc. "Offline summary for PDCCH structure and search space", Agenda Item: 7.1.3.1, Document for: Discussion and Decision, 3GPP TSG RAN WG1 Meeting #94, Gothenburg, Sweden, Aug. 20-24, 2018.
R1-1900218—Source: MediaTek Inc. "Enhancements on multi-beam operations", Agenda Item: 7.2.8.3, Document for: Discussion, 3GPP TSG RAN WG1 Ad-Hoc Meeting 1901, Taipei, Taiwan, Jan. 21-25, 2019.
International Search Report & Written Opinion related to Application No. PCT/CN2020/070079; reported on Aug. 5, 2021.
First Chinese Office Action for related Application No. 201910075898. 1; reported on Dec. 29, 2021.
3rd Generation Partnership Project, "Technical Specification Group Radio Access Network; Study on New Radio (NR) Access Technology Physical Layer Aspects", Nov. 2016, 3GPP TR 38,802 V1.0.0, Valbonne, France.
3rd Generation Partnership Project, "Technical Specification Group Radio Access Network; Study on New Radio (NR) Access Technology; Physical Layer Aspects", Mar. 2017, 3GPP TR 38.802 V2.0.0, Valbonne, France,.
Intel Corporation, "Summary on SCell BFR and Beam Measurement", Oct. 8-12, 2018, 3GPP TSG RAN WG1 Meeting #94b, Chengdu, China.
Convida Wireless, "On Beam Failure Recovery for SCell", Nov. 12-16, 2018, 3GPP TSG-RAN WG1 Meeting #95, Spokane, USA.
Lenovo, Motorola Mobility, "Resource configuration for beam failure recovery request", Jun. 27-29, 2017, 3GPP TSG-RAN WG2 Meeting#AH, Qingdao, China.
Huawei, Hisilicon, "non-contention based random access for beam failure recovery in CA", Jan. 22-26, 2018, 3GPP TSG-RAN WG2#AH-1801, Vancouver, Canada.
Ericsson, "Beam Failure Recovery in Scell and contention-based BFR on SpCell", Apr. 16-20, 2018, 3GPP TSG-RAN WG2 #101Bis, Sanya, P.R. of China.
Huawei, Hisilicon, "ASN.1 for Beam Failure Recovery", Apr. 16-20, 2018, 3GPP TSG-RAN WG2 Meeting 101bis, Sanya, China.
Huawei, Hisilicon, "Discussion on beam failure recovery for SCell", May 21-25, 2018, 3GPP TSG-RAN WG2 Meeting 102, Busan, Korea.
NTT DOCOMO, Inc., "Presentation of Specification/Report to TSG: TR 38.802, Version 2.0.0", Mar. 6-9, 2017, 3GPP TSG-RAN Meeting #75, Dubrovnik, Croatia.
First Japanese Office Action for related Application No. 2021-542547; reported on Aug. 29, 2022.
Spreadtrum Communications, "Discussion on multi-beam operation", Jan. 21-25, 2019, 3GPP TSG RAN WG1 Ad-Hoc Meeting 1901, R1-1900700, Taipei.
Intel Corporation, "Summary on SCell BFR and L1-SINR based beam selection", Jan. 21-25, 2019, 3GPP TSG RAN WG1 Ad-Hoc Meeting 1901, R1-1901443, Taipei.
Extended European Search Report related to Application No. 20744732.7 reported on Jun. 13, 2022.
Chinese Office Action related to Application No. 201910075898.1 reported on Jul. 14, 2022.
Russian Office Action related to Application No. 2021124931.7 reported on May 16, 2022.
R1-1716169, Source: AT&T, "On beam recovery for partial and full control channel failure" Document for: Discussion/Approval, Agenda item: 6.2.2.4, Release: 3GPP TSG RAN WG1 Meeting NR#3, Sep. 18-21, 2017, Nagoya, Japan.
R1-1710058, Source: CATT, "Considerations on DL beam failure and recovery" Document for: Discussion and Decision, Agenda item: 5.1.2.2.2, Release: 3GPP TSG RAN WG1 NR Ad-Hoc#2, Jun. 27-30, 2017, Qingdao, P.R. China.
R1-1707255, Source: Fujitsu, "Discussion on beam failure recovery procedure" Document for: Discussion/Decision, Agenda Item: 7.1. 2.2.2, Release: 3GPP TSG RAN WG1 Meeting #89, May 15-19, 2017, Hangzhou, P.R. China.
R1-1900092, Source: ZTE, "Additional considerations on beam management for multi-TRP" Document for: Discussion and Decision, Agenda Item: 7.2.8.6, Release: 3GPP TSG RAN WG1 Ad-Hoc Meeting 1901, Jan. 21-25, 2019, Taipei.
R2-1706680, Source: AT&T. "Beam Failure Recovery Mechanism and RLF" Document for: Discussion, Agenda item: 10.2.9, Release: 3GPP TSG-RAN WG2 NR-Adhoc, Jun. 27-29, 2017, Qingdao, China.

\* cited by examiner

METHOD FOR BEAM FAILURE RECOVERY, METHOD FOR BEAM FAILURE HANDLING, TERMINAL, AND NETWORK-SIDE DEVICE

CROSS-REFERENCE TO RELATED APPLICATIONS

This application is a continuation application of International Application No. PCT/CN2020/070079 filed on Jan. 2, 2020, which claims priority to Chinese Patent Application No. 201910075898.1, filed in China on Jan. 25, 2019, both disclosures of which are incorporated herein by reference in their entireties.

TECHNICAL FIELD

This disclosure relates to the field of communications technologies, and in particular, to a method for beam failure recovery, a method for beam failure handling, a terminal, and a network-side device.

BACKGROUND

At present, in the academia and industrial fields, a polling manner is typically used for training of analog beamforming vectors, that is, array elements of each polarization direction of each antenna panel send training signals (that is, candidate beamforming vectors) in turn at predetermined times in a time-division multiplexing manner. A terminal feeds back a beam report after measurement, so that the network side can use the training signals to implement emission of analog beams for a next service transmission. The content of the beam report typically includes identifiers of reference signal resources used by several optimal transmit beams (such as channel state information reference signal resource indicator (CRI); or synchronization signal block resource indicator: (SSBRI)) and a measured received power (such as L1-RSRP, layer 1-RSRP, layer 1 reference signal received power) of each transmit beam.

In a high-band communications system, due to relatively short wavelengths of radio signals, the signals are more likely to be blocked during transmission, resulting in interruption of signal transmission. Radio link reestablishment in the related art is relatively time-consuming. Therefore, a beam failure recovery (BFR) mechanism is introduced, and the mechanism is divided into the following four aspects of content:

Beam failure detection (BFD): A terminal performs measurement on a beam failure detection reference signal (BFD RS) at a physical layer, and determines, based on a measurement result, whether a beam failure event has occurred. A determining criterion is: if it is detected that a metric (such as a PDCCH block error rate) satisfies a preset condition (exceeding a preset threshold) for all serving beams, one beam failure instance (BFI) is determined, and the physical layer of the terminal reports an indication to a higher layer (for example, media access control (MAC) layer) of the terminal. This reporting procedure is periodical. A BFI reporting periodicity is a shortest periodicity of the BFD RS, with a lower limit being 2 ms. On the contrary, if the physical layer of the terminal device determines that no beam failure instance has occurred, no indication is transmitted to the higher layer. The higher layer of the terminal uses a counter and a timer to count BFIs reported by the physical layer, restarts the timer each time a BFI is received, and restarts the counter when the timer expires. When the counter reaches a maximum count configured by a network, the terminal determines that a beam failure event has occurred. In the related art, the counter and timer at the MAC layer of the terminal device are configured for each active bandwidth part (active BWP), and start and maintenance of the counter and timer on each BWP are independent, that is, the counter and timer of each BWP work independently, including start, reset, counting, timing, and the like.

New candidate beam identification: The physical layer of the terminal performs measurement on candidate beam reference signals (candidate beam RS) to find a new candidate beam. This step is not necessarily performed after occurrence of the beam failure event, but may alternatively be performed before occurrence of the beam failure event. When receiving a request, an indication, or a notification from the higher layer of the terminal, the physical layer of the terminal reports, to the higher layer of the terminal, measurement results that meet a preset condition (a measured L1-RSRP of the candidate beam RS exceeds a preset threshold), where content of the report is {beam reference signal index, L1-RSRP}, and the higher layer of the terminal selects a candidate beam based on the report of the physical layer.

Beam failure recovery request transmission: The higher layer of the terminal determines a physical random access channel (PRACH) resource based on the selected candidate beam. If the terminal finds the candidate beam and a contention-free PRACH resource is configured, a beam failure recovery request (BFRQ) is transmitted to the base station by using the contention-free PRACH resource. Otherwise, the terminal may use a contention-based PRACH resource. Only the contention-based PRACH resource can be used when a beam failure recovery timer expires. A total quantity of times of using the two types of PRACH resources cannot exceed a preset value. The contention-free PRACH resource herein and other PRACH resources (such as a PRACH resource used for initial access) may be frequency-division multiplexed (FDM) or code division multiplexed (CDM). In addition, in a related art, transmitting a BFRQ by using a physical uplink control channel (PUCCH) is also supported.

The terminal monitors response of the network-side device for the beam failure recovery request (UE monitors gNB response for beam failure recovery request): After receiving the BFRQ, the network-side device transmits a response in a dedicated Physical Downlink Control Channel (PDCCH) of a configured control resource set for BFR (CORESET-BFR), where the response carries a C-RNTI (Cell-Radio Network Temporary Identifier) or may further include an indication for switching over to a new candidate beam or restarting beam search, or other indications. The CORESET-BFR is spatially quasi-co-located (QCL) with a downlink reference signal (DL RS) of the candidate beam found by the terminal. If beam failure recovery is unsuccessful, the physical layer of the terminal sends an indication to the higher layer of the terminal for the higher layer to determine a subsequent radio link failure procedure.

For a multi-carrier scenario (which may be understood as carrier aggregation (CA), where there are multiple carriers or multiple component carriers (CC) or multiple cells), there is one primary cell (for example, a primary cell (PCell) in a master cell group (MCG), or a primary secondary cell (PSCell)) and at least one secondary cell Scell (Secondary cell) in a secondary cell group (SCG).

The current conclusion is that the beam failure recovery procedure is supported in the secondary cell Scell. Supported scenarios include that:

there are a downlink and an uplink in the Scell;
there is only a downlink in the Scell; and
the PCell may be in an FR1 (Frequency Range 1) or an FR2 (Frequency Range 2).

In related art, the BFR mechanism in 3GPP Release 15 is Pcell-based, and an Scell-based BFR mechanism is being studied in 3GPP Release 16. In the related art, there is still no discussion on how the BFR mechanism is designed after introduction of multiple transmission reception points (TRPs).

SUMMARY

Embodiments of this disclosure provide a method for beam failure recovery, including:
 obtaining, by a terminal, N pieces of configuration information, where the N pieces of configuration information are applicable to different transmission and reception points TRPs, the configuration information includes a parameter for beam failure recovery, and N is an integer greater than 1; and
 in a case that a beam failure event occurring on at least one TRP is determined, transmitting, by the terminal, a beam failure recovery request based on the configuration information.

An embodiment of this disclosure further provides a method for beam failure handling, applied to a network-side device and including:
 configuring N pieces of configuration information for a terminal, where the N pieces of configuration information are applicable to different transmission and reception points TRPs, the configuration information includes a parameter for beam failure recovery, and N is an integer greater than 1.

An embodiment of this disclosure further provides a terminal, including:
 an obtaining module, configured to obtain N pieces of configuration information, where the N pieces of configuration information are applicable to different transmission and reception points TRPs, the configuration information includes a parameter for beam failure recovery, and N is an integer greater than 1; and
 a request transmitting module, configured to: in a case that a beam failure event occurring on at least one TRP is determined, transmit a beam failure recovery request based on the configuration information.

An embodiment of this disclosure further provides a terminal, including a processor, a memory, and a computer program stored in the memory and capable of running on the processor. When the computer program is executed by the processor, the steps of the foregoing method for beam failure recovery are implemented.

An embodiment of this disclosure further provides a network-side device, including:
 a configuration module, configured to configure N pieces of configuration information for a terminal, where the N pieces of configuration information are applicable to different transmission and reception points TRPs, the configuration information includes a parameter for beam failure recovery, and N is an integer greater than 1.

An embodiment of this disclosure further provides a network-side device, including a processor, a memory, and a computer program stored in the memory and capable of running on the processor. When the computer program is executed by the processor, the steps of the foregoing method for beam failure handling are implemented.

An embodiment of this disclosure also provides a computer-readable storage medium. The computer-readable storage medium stores a computer program, and when the computer program is executed by a processor, the steps of the foregoing method for beam failure recovery are implemented, or the steps of the foregoing method for beam failure handling are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the embodiments of this disclosure, the terms "an example" or "for example" are used to represent an example, an illustration, or a description. Any embodiment or design solution described as "an example" or "for example" in the embodiments of this disclosure should not be construed as preferred or advantageous over other embodiments or design solutions. To be precise, the use of terms such as "an example" or "for example" is intended to present a related concept in a specific manner.

Figure 1:
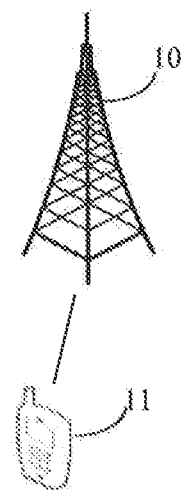
FIG. 1 is a schematic architectural diagram of a wireless communications system according to an embodiment of this disclosure.

The following describes the embodiments of this disclosure with reference to the accompanying drawings. A method for beam failure recovery, a method for beam failure processing, a terminal, and a network-side device provided in the embodiments of this disclosure may be applied to a wireless communication system. The wireless communications system may be a 5G system, or an evolved long term evolution (eLTE) system, or a subsequent evolved communications system. Referring to FIG. 1, FIG. 1 is a schematic architectural diagram of a wireless communications system according to an embodiment of this disclosure. As shown in FIG. 1, the wireless communication system may include: a network-side device 10 and a terminal (the terminal may also be referred to as a user-side device). For example, the terminal is denoted as UE 11, and the UE 11 may be connected to the network-side device 10. In an actual application, connection between the foregoing devices may be wireless connection. To conveniently and intuitively represent a connection relationship between the devices, a solid line is used in FIG. 1.

It should be noted that the communications system may include a plurality of UEs, and the network-side device may communicate (transmit signaling or transmit data) with the plurality of UEs.

The network-side device 10 provided in this embodiment of this disclosure may be a base station. The base station may be a commonly used base station, or may be an evolved node base station (eNB), or may be a device such as a network-side device (for example, a next generation base station (gNB), or a transmission and reception point (TRP)), or a cell in a 5G system.

The terminal provided in this embodiment of this disclosure may be a mobile phone, a tablet computer, a notebook computer, an ultra-mobile personal computer (UMPC), a netbook, a wearable device, an in-vehicle device, a personal digital assistant (PDA), or the like. It should be noted that a specific type of the terminal is not limited in the embodiments of this disclosure.

Figure 2:
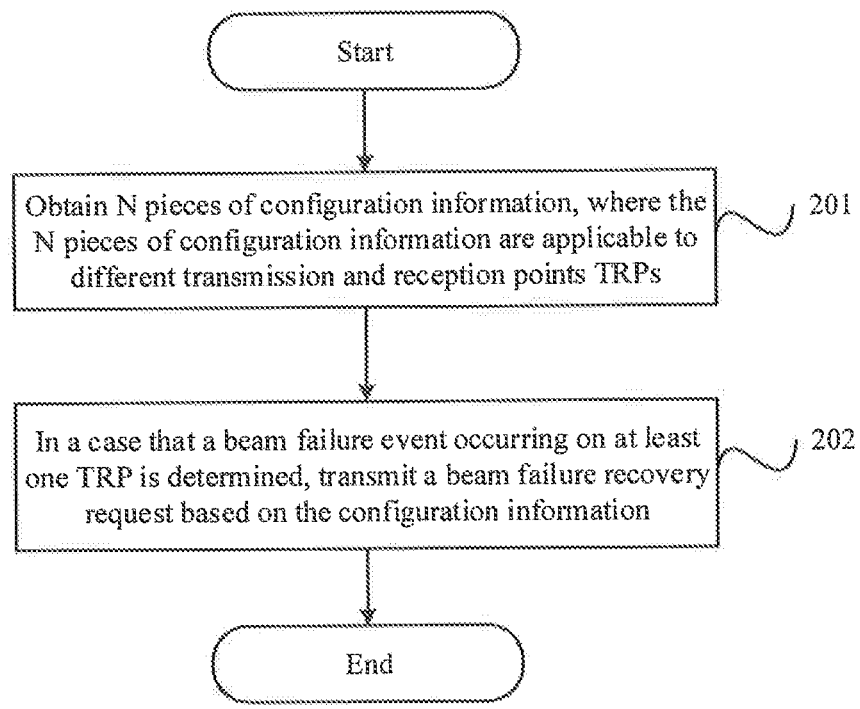
FIG. 2 is a flowchart of steps of a method for beam failure recovery according to an embodiment of this disclosure.

As shown in FIG. 2, an embodiment of this disclosure provides a method for beam failure recovery, applied to a terminal and including the following steps.

Step 201: Obtain N pieces of configuration information, where the N pieces of configuration information are applicable to different transmission and reception points TRPs, the configuration information includes a parameter for beam failure recovery, and N is an integer greater than 1.

Step 202: In a case that a beam failure event occurring on at least one TRP is determined, transmit a beam failure recovery request based on the configuration information.

Optionally, the configuration information includes at least one of the following:
- a beam failure detection reference signal;
- a candidate beam reference signal;
- a first resource used for transmitting a beam failure recovery request by the terminal; or
- a second resource used for transmitting a beam failure recovery request response by a network-side device.

In an optional embodiment, step 202 includes that:
the terminal performs measurement on beam failure detection reference signals included in the configuration information of the TRPs to determine whether a beam failure event occurs on the TRPs, where a determining condition is the same as that for an individual TRP, and details are not further described here; further, the terminal performs measurement on candidate beam reference signals included in the configuration information of the TRP with the beam failure event to determine a target candidate beam of the TRP with the beam failure event; further, the terminal uses the first resource included in the configuration information of the TRP with the beam failure event and used for transmitting a beam failure recovery request by the terminal to transmit a beam failure recovery request to the TRP with the beam failure event.

In an optional embodiment, different TRPs are identified by at least one of the following manners:
- different control resource sets, that is, different configuration information is applicable to different control resource sets;
- different control resource set groups, that is, different configuration information is applicable to different control resource set groups;
- different explicitly defined TRPs;
- different transmission configuration indicator states, that is, different configuration information is applicable to different transmission configuration indicator states;
- different transmission configuration indicator state lists, that is, different configuration information is applicable to different transmission configuration indicator state lists;
- different transmission configuration indicator state pools, that is, different configuration information is applicable to different transmission configuration indicator state pools;
- different quasi co-location QCL, that is, different configuration information is applicable to different quasi co-location QCL;
- different quasi co-location QCL groups, that is, different configuration information is applicable to different quasi co-location QCL groups;
- different spatial relations, that is, different configuration information is applicable to different spatial relations;
- different spatial relation groups, that is, different configuration information is applicable to different spatial relation groups;
- different physical downlink control channel PDCCH scrambling identifiers, that is, different configuration information is applicable to different PDCCH scrambling identifiers;
- different PDCCH scrambling identifier groups, that is, different configuration information is applicable to different PDCCH scrambling identifier groups;
- different physical downlink shared channel PDSCH scrambling identifiers, that is, different configuration information is applicable to different PDSCH scrambling identifiers;
- different PDSCH scrambling identifier groups, that is, different configuration information is applicable to different PDSCH scrambling identifier groups;
- different PDCCH-Config information elements, that is, different configuration information is applicable to different PDCCH-Config information elements; or
- different PDSCH-Config information elements, that is, different configuration information is applicable to different PDSCH-Config information elements.

Optionally, in the foregoing embodiment of this disclosure, the configuration information of different TRPs satisfies at least one of the following conditions:
- that beam failure detection reference signals are different;
- that candidate beam reference signals are different;
- that first resources used for transmitting a beam failure recovery request by the terminal are different;
- that first resources used for transmitting a beam failure recovery request by the terminal are the same;
- that second resources used for transmitting a beam failure recovery request response by the network-side device are different; or
- that second resources used for transmitting a beam failure recovery request response by the network-side device are the same.

In an optional embodiment, step 201 includes:
obtaining the N pieces of configuration information that are configured by a network-side device in one bandwidth part BWP, that is, a plurality of pieces of configuration information including beam failure recovery parameters and applicable to different TRPs are configured in one BWP.

It should be noted that the N pieces of configuration information may be received by using one piece of signaling or by using a plurality of pieces of signaling, which is not specifically limited herein.

In an optional embodiment, in a case that a beam failure event occurs on a first TRP, step 202 in the foregoing embodiment of this disclosure includes:

transmitting a beam failure recovery request to the first TRP based on a first resource, used for transmitting a beam failure recovery request by the terminal, in configuration information corresponding to the first TRP;

or transmitting a beam failure recovery request to a second TRP based on a first resource, used for transmitting a beam failure recovery request by the terminal, in configuration information corresponding to the second TRP other than the first TRP, where the beam failure recovery request is forwarded to the first TRP by the second TRP.

In short, this embodiment of this disclosure provides two manners: directly transmitting the beam failure recovery request and indirectly transmitting the beam failure recovery request.

It should be noted that, in a case that a beam failure event occurs on a plurality of TRPs, the following two manners for transmitting a beam failure recovery request are provided in this embodiments of this disclosure:

Manner 1: In a case that a beam failure event occurs on M TRPs, and first resources, used for transmitting a beam failure recovery request by the terminal, in configuration information of the M TRPs are different, where M is an integer greater than 1, step 202 includes:

transmitting a beam failure recovery request to each of the M TRPs with the beam failure event by using different first resources in the configuration information of the M TRPs.

In other words, the terminal may transmit respective beam failure recovery requests by using first resources corresponding to different TRPs and used for transmitting a beam failure recovery request.

Manner 2: In a case that a beam failure event occurs on M TRPs, and first resources, used for transmitting a beam failure recovery request by the terminal, in configuration information of the M TRPs are the same, where M is an integer greater than 1, step 202 includes:

transmitting a beam failure recovery request to a higher-priority TRP in the M TRPs with the beam failure event by using the first resource in the configuration information of the M TRPs.

In other words, based on preset priorities, the terminal preferentially transmits the beam failure recovery request to the higher-priority TRP.

Correspondingly, in a scenario in which a beam failure event occurs on a plurality of TRPs, the plurality of TRPs with the beam failure event may share the second resource for transmitting the beam failure recovery request response. In other words, in the case that the beam failure event occurs on the M TRPs, and the second resources, used for transmitting the beam failure recovery request response by the network-side device, in the configuration information of the M TRPs are the same, where M is an integer greater than 1, the method further includes:

receiving a beam failure recovery request response that is transmitted by the higher-priority TRP in the M TRPs with the beam failure event by using the second resource in the configuration information.

It should be noted that the second resources, used for transmitting the beam failure recovery request response by the network-side device, in the configuration information includes: a control resource set for beam failure recovery CORESET-BFR.

In other words, in a case that the plurality of TRPs share one CORESET-BFR, when the beam failure event occurs on the M TRPs, the higher-priority TRP transmits a beam failure recovery request response by using the CORESET-BFR based on the preset priorities.

It should be noted that, in the case that the plurality of TRPs share one CORESET-BFR, when a beam failure event occurs on one TRP, the TRP with the beam failure event transmits a beam failure recovery request response by using the CORESET-BFR.

Optionally, in the foregoing embodiment of this disclosure, the priority of the TRP is determined based on at least one of the following information:

index information of a control resource set;

index information of a control resource set group;

identification information of an explicitly defined TRP;

information about a transmission configuration indicator state, such as index information, source reference signal information, and QCL type information;

information about a transmission configuration indicator state list, such as index information, source reference signal information, and QCL type information;

information about a transmission configuration indicator state pool, such as index information, source reference signal information, and QCL type information;

quasi-co-location QCL information, such as index information, source reference signal information, and QCL type information;

quasi-co-location QCL group information, such as index information, source reference signal information, and QCL type information;

spatial relation information, such as index information and source reference signal information;

spatial relation group information, such as index information and source reference signal information;

PDCCH scrambling identifier information;

PDCCH scrambling identifier group information;

PDSCH scrambling identifier information;

PDSCH scrambling identifier group information;

information about a PDCCH-Config information element;

or information about a PDSCH-Config information element.

For example, in a case that different control resource sets are used to identify different TRPs, a priority of a control resource set 1 (corresponding to TRP1) is higher than a priority of a control resource set 2 (corresponding to TRP2). Examples are not provided one by one herein. The priorities of the TRP s may be pre-defined by the protocol or the network.

Further, in the foregoing embodiment of this disclosure, after the terminal transmits the beam failure recovery request, the method further includes:

if a preset condition is satisfied, transmitting, by the terminal by using spatial relation information of a PUCCH associated with a TRP with a beam failure event, the PUCCH within a preset period of time.

In other words, in this embodiment of this disclosure, during reconfiguration of spatial relation information of a PUCCH resource, only spatial relation information of the PUCCH associated with the TRP with the beam failure event may be reset; for a TRP without a beam failure event, spatial relation information of the PUCCH does not need to be reset.

For example, two TRPs are configured, a failure event occurs on TRP 1, and no beam failure event occurs on TRP 2. In this case, only a PUCCH associated with TRP 1 is transmitted. Further, in order to receive the PUCCH correctly by the network side, it is pre-determined that the terminal uses spatial relation information of the PUCCH associated with the TRP 1 to transmit the PUCCH until the network side configures, reconfigures, or activates the spatial relation information of the PUCCH resource.

Alternatively, in the foregoing embodiment of this disclosure, the method further includes:

skipping transmitting a PUCCH in a case that after transmitting a beam failure recovery request to a TRP with a beam failure event, the terminal does not receive, within a third preset duration, downlink information that is transmitted by the TRP with the beam failure event.

Optionally, the preset condition is at least one of the following:

the terminal receives downlink information that is transmitted by the TRP with the beam failure event;
the terminal transmits a beam failure recovery request to the TRP with the beam failure event; or
the terminal transmits a beam failure recovery request to the TRP with the beam failure event, and does not receive, within a first preset duration, downlink information transmitted by the TRP with the beam failure event.

Optionally, in the foregoing embodiment of this disclosure, the downlink information includes at least one of the following:

a PDCCH on a control resource set for beam failure recovery CORESET-BFR associated with the TRP with the beam failure event;
downlink control information DCI;
a random access response RAR;
a release command or deactivation command used for releasing a cell with a beam failure;
information triggering beam measurement and/or beam reporting for the TRP with the beam failure event;
information triggering channel state information CSI measurement and/or CSI reporting for the TRP with the beam failure event; or
acknowledgement ACK or negative acknowledgement NACK corresponding to scheduling information of the TRP with the beam failure event, where the scheduling information includes scheduling information for cross-carrier scheduling.

Optionally, the preset period of time starts:
when the preset condition is satisfied; or
when a second preset duration elapses after the preset condition is satisfied.

The terminal determines, in one of the following manners, the spatial relation information of the PUCCH associated with the TRP with the beam failure event:

using spatial relation information of an uplink channel for transmitting a beam failure recovery request in a preset cell;
using spatial relation information or QCL information of a preset channel in the preset cell;
using spatial relation information or QCL information of a preset reference signal in the preset cell;
using spatial relation information or QCL information of a preset channel in a primary cell Pcell; or
using spatial relation information or QCL information of a preset reference signal in the primary cell Pcell.

It should be noted that the preset cell may be a cell for the TRP with the beam failure event; the uplink channel for transmitting the beam failure recovery request in the preset cell may be merely a contention-free PRACH; or the uplink channel is a contention-free PRACH or a contention-based PRACH; or the uplink channel is a PUCCH; or the uplink channel is an uplink channel corresponding to a MAC CE (MAC control element).

The preset channel is one of the following: a physical uplink control channel PUCCH, a physical random access channel PRACH, a physical uplink shared channel PUSCH, a physical downlink control channel PDCCH, or a physical downlink shared channel PDSCH.

The preset reference signal is one of the following: a channel sounding reference signal SRS, a channel state information reference signal CSI-RS, a synchronization signal block SSB, a tracking reference signal TRS, or a phase tracking reference signal PTRS.

In summary, in this embodiment of this disclosure, the network configures, for the terminal, N pieces of configuration information applicable to different TRPs, so that a beam of each TRP can be quickly restored in case of a beam failure event, thereby resolving a beam failure recovery problem in a multi-TRP scenario.

Figure 3:
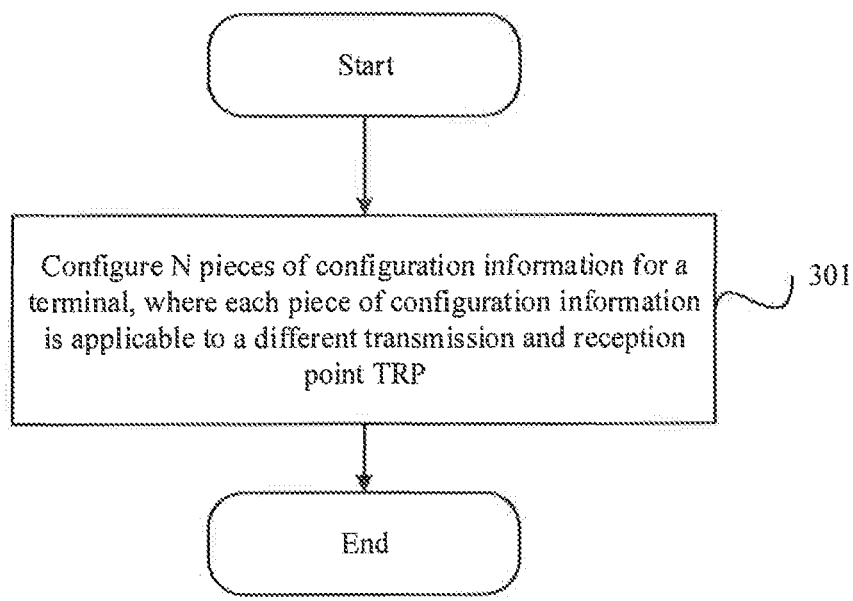
FIG. 3 is a schematic diagram of steps of a method for beam failure handling according to an embodiment of this disclosure.

As shown in FIG. 3, an embodiment of this disclosure further provides a method for beam failure handling, applied to a network-side device and including the following steps.

Step 301: Configure N pieces of configuration information for a terminal, where the N pieces of configuration information are applicable to different transmission and reception points TRPs, the configuration information includes a parameter for beam failure recovery, and N is an integer greater than 1.

Optionally, the configuration information includes at least one of the following:
a beam failure detection reference signal;
a candidate beam reference signal;
a first resource used for transmitting a beam failure recovery request by the terminal; or
a second resource used for transmitting a beam failure recovery request response by a network-side device.

Optionally, the terminal performs measurement on beam failure detection reference signals included in the configuration information of the TRPs to determine whether a beam failure event occurs on the TRPs, where a determining condition is the same as that for an individual TRP, and details are not further described here. Further, the terminal performs measurement on candidate beam reference signals included in the configuration information of the TRP with the beam failure event to determine a target candidate beam of the TRP with the beam failure event. Further, the terminal uses the first resource included in the configuration information of the TRP with the beam failure event and used for transmitting a beam failure recovery request by the terminal to transmit a beam failure recovery request to the TRP with the beam failure event.

In an optional embodiment, different TRPs are identified by at least one of the following manners:
different control resource sets, that is, different configuration information is applicable to different control resource sets;
different control resource set groups, that is, different configuration information is applicable to different control resource set groups;
different explicitly defined TRPs;

different transmission configuration indicator states, that is, different configuration information is applicable to different transmission configuration indicator states;

different transmission configuration indicator state lists, that is, different configuration information is applicable to different transmission configuration indicator state lists;

different transmission configuration indicator state pools, that is, different configuration information is applicable to different transmission configuration indicator state pools;

different quasi co-location QCL, that is, different configuration information is applicable to different quasi co-location QCL;

different quasi co-location QCL groups, that is, different configuration information is applicable to different quasi co-location QCL groups;

different spatial relations, that is, different configuration information is applicable to different spatial relations;

different spatial relation groups, that is, different configuration information is applicable to different spatial relation groups;

different physical downlink control channel PDCCH scrambling identifiers, that is, different configuration information is applicable to different PDCCH scrambling identifiers;

different PDCCH scrambling identifier groups, that is, different configuration information is applicable to different PDCCH scrambling identifier groups;

different physical downlink shared channel PDSCH scrambling identifiers, that is, different configuration information is applicable to different PDSCH scrambling identifiers;

different PDSCH scrambling identifier groups, that is, different configuration information is applicable to different PDSCH scrambling identifier groups;

different PDCCH-Config information elements, that is, different configuration information is applicable to different PDCCH-Config information elements; or different PDSCH-Config information elements, that is, different configuration information is applicable to different PDSCH-Config information elements.

Optionally, in the foregoing embodiment of this disclosure, the configuration information of different TRPs satisfies at least one of the following conditions:

that beam failure detection reference signals are different;

that candidate beam reference signals are different;

that first resources used for transmitting a beam failure recovery request by the terminal are different;

that first resources used for transmitting a beam failure recovery request by the terminal are the same;

that second resources used for transmitting a beam failure recovery request response by the network-side device are different; or that second resources used for transmitting a beam failure recovery request response by the network-side device are the same.

In an optional embodiment, step 301 includes:

configuring the N pieces of configuration information for the terminal in one bandwidth part BWP, that is, a plurality of pieces of configuration information including beam failure recovery parameters and applicable to different TRPs are configured in one BWP.

It should be noted that the N pieces of configuration information may be transmitted by using one piece of signaling or by using a plurality of pieces of signaling, which is not specifically limited herein.

In an optional embodiment, in a case that a beam failure event occurs on a first TRP, the method further includes:

if the network-side device is a first TRP with a beam failure event, receiving a beam failure recovery request that is transmitted by the terminal based on the configuration information;

or if the network-side device is a second TRP other than the first TRP with the beam failure event, receiving a beam failure recovery request that is transmitted by the terminal based on the configuration information, and forwarding the beam failure recovery request to the first TRP.

It should be noted that, in a case that a beam failure event occurs on a plurality of TRPs, the following two manners for transmitting a beam failure recovery request are provided in this embodiments of this disclosure.

Manner 1: In a case that a beam failure event occurs on M TRPs, and first resources, used for transmitting a beam failure recovery request by the terminal, in configuration information of the M TRPs are different, where M is an integer greater than 1, the method further includes:

receiving a beam failure recovery request that is transmitted by the terminal to each of the M TRPs with the beam failure event by using different first resources in the configuration information of the M TRPs.

In other words, the terminal may transmit respective beam failure recovery requests by using first resources corresponding to different TRPs and used for transmitting a beam failure recovery request.

Manner 2: In a case that a beam failure event occurs on M TRPs, and first resources, used for transmitting a beam failure recovery request by the terminal, in configuration information of the M TRPs are the same, where M is an integer greater than 1, the method further includes:

receiving a beam failure recovery request that is transmitted by the terminal to a higher-priority TRP in the M TRPs with the beam failure event by using the first resource in the configuration information of the M TRPs.

In other words, based on preset priorities, the terminal preferentially transmits the beam failure recovery request to the higher-priority TRP.

Correspondingly, in a scenario in which a beam failure event occurs on a plurality of TRPs, the plurality of TRPs with the beam failure event may share the second resource for transmitting the beam failure recovery request response. In other words, in the case that the beam failure event occurs on the M TRPs, and the second resources, used for transmitting the beam failure recovery request response by the network-side device, in the configuration information of the M TRPs are the same, where M is an integer greater than 1, the method further includes:

transmitting, by the higher-priority TRP in the M TRPs, a beam failure recovery request response to the terminal by using the second resource in the configuration information of the TRP.

It should be noted that the second resources, used for transmitting the beam failure recovery request response by the network-side device, in the configuration information includes: a control resource set for beam failure recovery CORESET-BFR.

In other words, in a case that the plurality of TRPs share one CORESET-BFR, when the beam failure event occurs on the M TRPs, the higher-priority TRP transmits a beam failure recovery request response by using the CORESET-BFR based on the preset priorities.

It should be noted that, in the case that the plurality of TRPs share one CORESET-BFR, when a beam failure event occurs on one TRP, the TRP with the beam failure event transmits a beam failure recovery request response by using the CORESET-BFR.

Optionally, in the foregoing embodiment of this disclosure, the priority of the TRP is determined based on at least one of the following information:
- index information of a control resource set;
- index information of a control resource set group;
- identification information of an explicitly defined TRP;
- information about a transmission configuration indicator state, such as index information, source reference signal information, and QCL type information;
- information about a transmission configuration indicator state list, such as index information, source reference signal information, and QCL type information;
- information about a transmission configuration indicator state pool, such as index information, source reference signal information, and QCL type information;
- quasi-co-location QCL information, such as index information, source reference signal information, and QCL type information;
- quasi-co-location QCL group information, such as index information, source reference signal information, and QCL type information;
- spatial relation information, such as index information and source reference signal information;
- spatial relation group information, such as index information and source reference signal information;
- PDCCH scrambling identifier information;
- PDCCH scrambling identifier group information;
- PDSCH scrambling identifier information;
- PDSCH scrambling identifier group information;
- information about a PDCCH-Config information element; or
- information about a PDSCH-Config information element.

For example, in a case that different control resource sets are used to identify different TRPs, a priority of a control resource set 1 (corresponding to TRP1) is higher than a priority of a control resource set 2 (corresponding to TRP2). Examples are not provided one by one herein. The priorities of the TRP s may be pre-defined by the protocol or the network.

Further, in the foregoing embodiment of this disclosure, after the terminal transmits the beam failure recovery request, the method further includes:
- receiving, by using determined spatial relation information, a PUCCH that is transmitted within a preset period of time by the terminal.

It should be noted that, in this embodiment of this disclosure, during reconfiguration of spatial relation information of a PUCCH resource, only spatial relation information of the PUCCH associated with the TRP with the beam failure event may be reset; for a TRP without a beam failure event, spatial relation information of the PUCCH does not need to be reset.

Optionally, the receiving, by using determined spatial relation information, a PUCCH that is transmitted within a preset period of time by the terminal satisfying a preset condition includes:
- skipping transmitting downlink information after receiving the beam failure recovery request transmitted by the terminal; and receiving, by using the determined spatial relation information, the PUCCH that is transmitted within the preset period of time by the terminal satisfying the preset condition.

Alternatively, downlink information is transmitted after the beam failure recovery request transmitted by the terminal is received; and the PUCCH transmitted within the preset period of time by the terminal satisfying the preset condition is received by using the determined spatial relation information.

Optionally, the determined spatial relation information is: spatial relation information of a PUCCH associated with the TRP with the beam failure event.

For example, two TRPs are configured, a failure event occurs on TRP 1, and no beam failure event occurs on TRP 2. In this case, only a PUCCH associated with TRP 1 is transmitted. Further, in order to receive the PUCCH correctly by the network side, it is pre-determined that the terminal uses spatial relation information of the PUCCH associated with the TRP 1 to transmit the PUCCH until the network side configures, reconfigures, or activates the spatial relation information of the PUCCH resource.

Optionally, in the foregoing embodiment of this disclosure, the network side determines, in one of the following manners, the spatial relation information of the PUCCH associated with the TRP with the beam failure event:
- using spatial relation information of an uplink channel for transmitting a beam failure recovery request in a preset cell;
- using spatial relation information or QCL information of a preset channel in the preset cell;
- using spatial relation information or QCL information of a preset reference signal in the preset cell;
- using spatial relation information or QCL information of a preset channel in a primary cell Pcell; or
- using spatial relation information or QCL information of a preset reference signal in the primary cell Pcell.

It should be noted that the preset cell may be a cell for the TRP with the beam failure event; the uplink channel for transmitting the beam failure recovery request in the preset cell may be merely a contention-free PRACH; or the uplink channel is a contention-free PRACH or a contention-based PRACH; or the uplink channel is a PUCCH; or the uplink channel is an uplink channel corresponding to a MAC CE (MAC control element).

The preset channel is one of the following: a physical uplink control channel PUCCH, a physical random access channel PRACH, a physical uplink shared channel PUSCH, a physical downlink control channel PDCCH, or a physical downlink shared channel PDSCH.

The preset reference signal is one of the following: a channel sounding reference signal SRS, a channel state information reference signal CSI-RS, a synchronization signal block SSB, a tracking reference signal TRS, or a phase tracking reference signal PTRS.

Optionally, the preset condition is at least one of the following:
- the terminal receives downlink information that is transmitted by the TRP with the beam failure event;
- the terminal transmits a beam failure recovery request to the TRP with the beam failure event; or
- the terminal transmits a beam failure recovery request to the TRP with the beam failure event, and does not receive, within a first preset duration, downlink information transmitted by the TRP with the beam failure event.

The downlink information includes at least one of the following:
- a PDCCH on a control resource set for beam failure recovery CORESET-BFR associated with the TRP with the beam failure event;

downlink control information DCI;

a random access response RAR;

a release command or deactivation command used for releasing a cell with a beam failure;

information triggering beam measurement and/or beam reporting for the TRP with the beam failure event;

information triggering channel state information CSI measurement and/or CSI reporting for the TRP with the beam failure event; or acknowledgement ACK or negative acknowledgement NACK corresponding to scheduling information of the TRP with the beam failure event.

In an optional embodiment, the preset period of time starts:

when the preset condition is satisfied; or when a second preset duration elapses after the preset condition is satisfied.

In summary, in this embodiment of this disclosure, the network configures, for the terminal, N pieces of configuration information applicable to different TRPs, so that a beam of each TRP can be quickly restored in case of a beam failure event, thereby resolving a beam failure recovery problem in a multi-TRP scenario.

Figure 4:
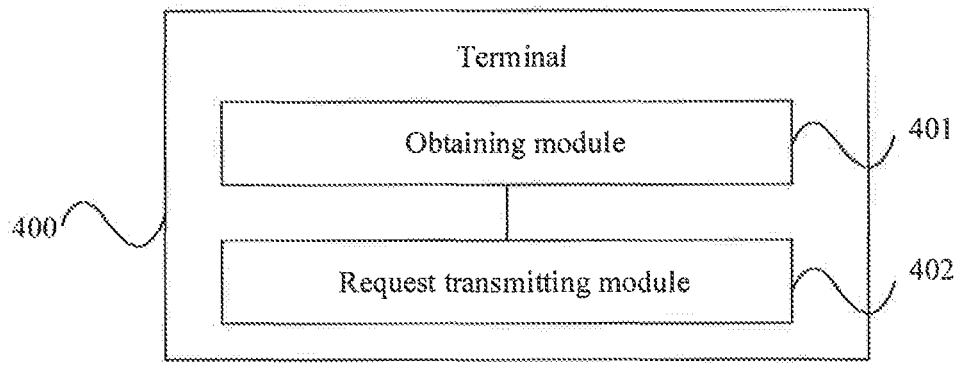
FIG. 4 is a first schematic structural diagram of a terminal according to an embodiment of this disclosure.

As shown in FIG. 4, an embodiment of this disclosure further provides a terminal 400, including:

an obtaining module 401, configured to obtain N pieces of configuration information, where the N pieces of configuration information are applicable to different transmission and reception points TRPs, the configuration information includes a parameter for beam failure recovery, and N is an integer greater than 1; and a request transmitting module 402, configured to: in a case that a beam failure event occurring on at least one TRP is determined, transmit a beam failure recovery request based on the configuration information.

Optionally, in the foregoing embodiment of this embodiment, different TRPs are identified by at least one of the following manners:

different control resource sets;

different control resource set groups;

different explicitly defined TRPs;

different transmission configuration indicator states;

different transmission configuration indicator state lists;

different transmission configuration indicator state pools;

different quasi co-location QCL;

different quasi co-location QCL groups;

different spatial relations;

different spatial relation groups;

different physical downlink control channel PDCCH scrambling identifiers;

different PDCCH scrambling identifier groups;

different physical downlink shared channel PDSCH scrambling identifiers;

different PDSCH scrambling identifier groups;

different PDCCH-Config information elements; or different PDSCH-Config information elements.

Optionally, in the foregoing embodiment of this disclosure, the configuration information includes at least one of the following:

a beam failure detection reference signal;

a candidate beam reference signal;

a first resource used for transmitting a beam failure recovery request by the terminal; or a second resource used for transmitting a beam failure recovery request response by a network-side device.

Optionally, in the foregoing embodiment of this disclosure, the configuration information of different TRPs satisfies at least one of the following conditions:

that beam failure detection reference signals are different;

that candidate beam reference signals are different;

that first resources used for transmitting a beam failure recovery request by the terminal are different;

that first resources used for transmitting a beam failure recovery request by the terminal are the same;

that second resources used for transmitting a beam failure recovery request response by the network-side device are different; or that second resources used for transmitting a beam failure recovery request response by the network-side device are the same.

Optionally, in the foregoing embodiment of this disclosure, the obtaining module includes:

an obtaining submodule, configured to obtain the N pieces of configuration information that are configured by the network-side device in one bandwidth part BWP.

Optionally, in the foregoing embodiment of this disclosure, the request transmitting module includes:

a third request transmitting submodule, configured to: in a case that a beam failure event occurs on a first TRP, transmit a beam failure recovery request to the first TRP based on a first resource, used for transmitting a beam failure recovery request by the terminal, in configuration information corresponding to the first TRP; or transmit a beam failure recovery request to a second TRP based on a first resource, used for transmitting a beam failure recovery request by the terminal, in configuration information corresponding to the second TRP other than the first TRP, where the beam failure recovery request is forwarded to the first TRP by the second TRP.

Optionally, in the foregoing embodiment of this disclosure, the request transmitting module includes:

a first request transmitting submodule, configured to: in a case that a beam failure event occurs on M TRPs, and first resources, used for transmitting a beam failure recovery request by the terminal, in configuration information of the M TRPs are different, transmit a beam failure recovery request to each of the M TRPs with the beam failure event by using different first resources in the configuration information of the M TRPs, where M is an integer greater than 1.

Optionally, in the foregoing embodiment of this disclosure, the request transmitting module includes:

a second request transmitting submodule, configured to: in a case that a beam failure event occurs on M TRPs, and first resources, used for transmitting a beam failure recovery request by the terminal, in configuration information of the M TRPs are the same, transmit a beam failure recovery request to a higher-priority TRP in the M TRPs with the beam failure event by using the first resource in the configuration information of the M TRPs, where M is an integer greater than 1.

Optionally, in the foregoing embodiment of this disclosure, the terminal further includes:

a response receiving module, configured to: in a case that a beam failure event occurs on M TRPs, and second resources, used for transmitting a beam failure recovery request response by a network-side device, in configuration information of the M TRPs are the same, receive a beam failure recovery request response that is transmitted by a higher-priority TRP in the M TRPs with the beam failure event by using the second resource in the configuration information, where M is an integer greater than 1.

Optionally, in the foregoing embodiment of this disclosure, the second resource, used for transmitting a beam failure recovery request response by the network-side device, in the configuration information includes:

a control resource set for beam failure recovery CORESET-BFR.

Optionally, in the foregoing embodiment of this disclosure, the priority of the TRP is determined based on at least one of the following information:

index information of a control resource set;
index information of a control resource set group;
identification information of an explicitly defined TRP;
information about a transmission configuration indicator state;
information about a transmission configuration indicator state list;
information about a transmission configuration indicator state pool;
quasi-co-location QCL information;
quasi-co-location QCL group information;
spatial relation information;
spatial relation group information;
PDCCH scrambling identifier information;
PDCCH scrambling identifier group information;
PDSCH scrambling identifier information;
PDSCH scrambling identifier group information;
information about a PDCCH-Config information element; or
information about a PDSCH-Config information element.

Optionally, in the foregoing embodiment of this disclosure, the terminal further includes:

a first transmitting module, configured to: if a preset condition is satisfied, transmit, by using spatial relation information of a PUCCH associated with a TRP with a beam failure event, the PUCCH within a preset period of time.

Optionally, in the foregoing embodiment of this disclosure, the terminal further includes:

a processing module, configured to skip transmitting a PUCCH in a case that after transmitting a beam failure recovery request to a TRP with a beam failure event, the terminal does not receive, within a third preset duration, downlink information that is transmitted by the TRP with the beam failure event.

Optionally, in the foregoing embodiment of this disclosure, the preset condition is at least one of the following:

the terminal receives downlink information that is transmitted by the TRP with the beam failure event;
the terminal transmits a beam failure recovery request to the TRP with the beam failure event; or
the terminal transmits a beam failure recovery request to the TRP with the beam failure event, and does not receive, within a first preset duration, downlink information transmitted by the TRP with the beam failure event.

Optionally, in the foregoing embodiment of this disclosure, the downlink information includes at least one of the following:

a PDCCH on a control resource set for beam failure recovery CORESET-BFR associated with the TRP with the beam failure event;
downlink control information DCI;
a random access response RAR;
a release command or deactivation command used for releasing a cell with a beam failure;
information triggering beam measurement and/or beam reporting for the TRP with the beam failure event;
information triggering channel state information CSI measurement and/or CSI reporting for the TRP with the beam failure event; or
acknowledgement ACK or negative acknowledgement NACK corresponding to scheduling information of the TRP with the beam failure event.

Optionally, in the foregoing embodiment of this disclosure, the preset period of time starts:

when the preset condition is satisfied; or
when a second preset duration elapses after the preset condition is satisfied.

Optionally, in the foregoing embodiment of this disclosure, the terminal further includes:

a first information determining module, configured to determine, in one of the following manners, the spatial relation information of the PUCCH associated with the TRP with the beam failure event:

using spatial relation information of an uplink channel for transmitting a beam failure recovery request in a preset cell;
using spatial relation information or QCL information of a preset channel in the preset cell;
using spatial relation information or QCL information of a preset reference signal in the preset cell;
using spatial relation information or QCL information of a preset channel in a primary cell; or
using spatial relation information or QCL information of a preset reference signal in the primary cell.

The terminal provided in this embodiment of this disclosure is capable of implementing processes that are implemented by the terminal in the method embodiment of FIG. 2. To avoid repetition, details are not described herein again.

In summary, in this embodiment of this disclosure, the network configures, for the terminal, N pieces of configuration information applicable to different TRPs, so that a beam of each TRP can be quickly restored in case of a beam failure event, thereby resolving a beam failure recovery problem in a multi-TRP scenario.

It should be noted that the terminal provided in this embodiment of this disclosure is a terminal capable of executing the foregoing method for beam failure recovery, and all embodiments of the foregoing method for beam failure recovery are applicable to the terminal, with the same or similar beneficial effects achieved.

Figure 5:
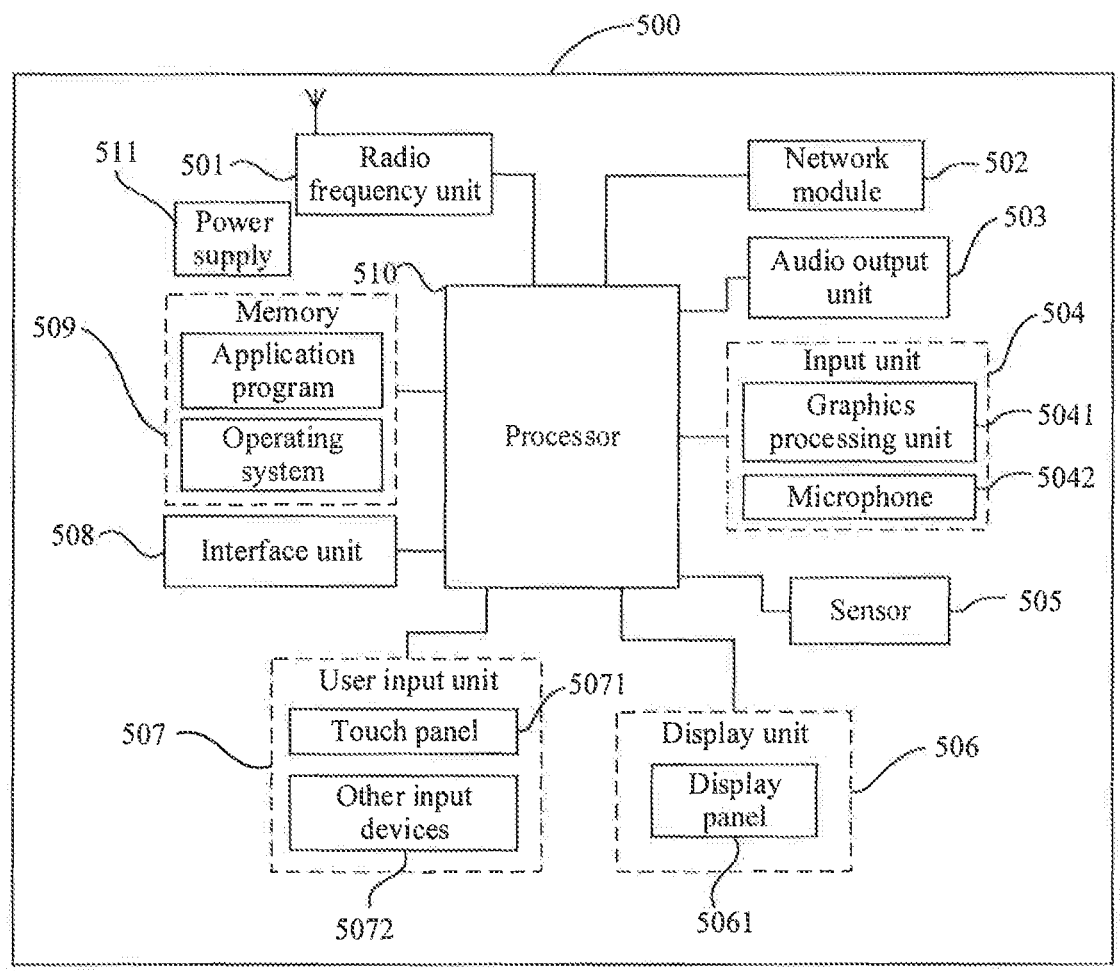
FIG. 5 is a second schematic structural diagram of a terminal according to an embodiment of this disclosure.

FIG. 5 is a schematic structural diagram of hardware of a terminal for implementing the embodiments of this disclosure. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 501 is configured to obtain N pieces of configuration information, where the N pieces of configuration information are applicable to different transmission and reception points TRPs, the configuration information includes a parameter for beam failure recovery, and N is an integer greater than 1.

The processor 510 is configured to: in a case that a beam failure event occurring on at least one TRP is determined, transmit a beam failure recovery request based on the configuration information by using the radio frequency unit 501.

In summary, in this embodiment of this disclosure, the network configures, for the terminal, N pieces of configuration information applicable to different TRPs, so that a beam of each TRP can be quickly restored in case of a beam failure event, thereby resolving a beam failure recovery problem in a multi-TRP scenario.

It should be noted that the terminal provided in this embodiment of this disclosure is a terminal capable of executing the foregoing method for beam failure recovery, and all embodiments of the foregoing method for beam failure recovery are applicable to the terminal, with the same or similar beneficial effects achieved.

It should be understood that, in this embodiment of this disclosure, the radio frequency unit 501 may be configured to: receive and transmit signals in an information receiving/transmitting process or a call process; and specifically, after receiving downlink data from a base station, transmit the downlink information to the processor 510 for processing, and in addition, transmit uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may also communicate with a network and other devices via a wireless communications system.

The terminal provides a user with wireless broadband internet access through the network module 502, for example, helping the user to transmit and receive e-mails, browse web pages, and access streaming media.

The audio output unit 503 may convert audio data received by the radio frequency unit 501 or the network module 502 or stored in the memory 509 into an audio signal and output the audio signal as a sound. Furthermore, the audio output unit 503 may also provide audio output (for example, a call signal received sound or a message received sound) related to a specific function performed by the terminal 500. The audio output unit 503 includes a speaker, a buzzer, a receiver, and the like.

The input unit 504 is configured to receive an audio or video signal. The input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. A processed image frame may be displayed on the display unit 506. The image frame processed by the graphics processing unit 5041 may be stored in the memory 509 (or another storage medium) or be transmitted by the radio frequency unit 501 or the network module 502. The microphone 5042 is capable of receiving sounds and processing such sounds into audio data. The processed audio data may be converted in a telephone call mode into a format that can be transmitted by the radio frequency unit 501 to a mobile communications base station, for outputting.

The terminal 500 may further include at least one sensor 505, for example, an optical sensor, a motion sensor, and another sensor. Specifically, the optical sensor may include an ambient light sensor and a proximity sensor. The ambient light sensor may adjust luminance of the display panel 5061 based on brightness of ambient light, and the proximity sensor may turn off the display panel 5061 and/or backlight when the terminal 500 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided to the user. The display unit 506 may include a display panel 5061, and the display panel 5061 may be configured in a form of a liquid crystal display (LCD), an organic light-emitting diode (OLED), or the like.

The user input unit 507 may be configured to receive input digit or character information and generate key signal input related to user setting and function control of the mobile terminal. Specifically, the user input unit 507 may include a touch panel 5071 and other input devices 5072. The touch panel 5071 is also referred to as a touchscreen and can collect a touch operation (such as an operation performed by the user on the touch panel 5071 or near the touch panel 5071 with a finger or by using any proper object or accessory such as a stylus) of the user on or near the touch panel 5071. The touch panel 5071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 510, and can receive a command transmitted by the processor 510 and execute the command. In addition, the touch panel 5071 may be implemented in a plurality of forms, for example, as a resistive, capacitive, infrared, or surface acoustic wave touch panel. In addition to the touch panel 5071, the user input unit 507 may further include other input devices 5072. Specifically, the other input devices 5072 may include but are not limited to a physical keyboard, a function key (such as a volume control key or an on/off key), a trackball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides a corresponding visual output on the display panel 5061 based on the type of the touch event. Although in FIG. 5, the touch panel 5071 and the display panel 5061 act as two independent parts to implement input and output functions of the terminal, in some embodiments, the touch panel 5071 and the display panel 5061 may be integrated to implement the input and output functions of the terminal. This is not specifically limited herein.

The interface unit 508 is an interface between an external apparatus and the terminal 500. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 508 may be configured to: receive input (for example, data information and power) from the external apparatus, and transmit the received input to one or more elements in the terminal 500, or may be configured to transmit data between the terminal 500 and the external apparatus.

The memory 509 may be configured to store software programs and various data. The memory 509 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 509 may include a high-speed random access memory, and may further include a non-volatile memory such as at least one disk storage device, a flash memory device, or another volatile solid-state storage device.

The processor 510 is a control center of the terminal, and is connected to all components of the terminal by using various interfaces and lines. By running or executing a software program and/or module that is stored in the memory 509 and calling data stored in the memory 509, the processor 510 executes various functions of the terminal and processes data, so as to perform overall monitoring on the terminal. The processor 510 may include one or more processing units. Optionally, an application processor and a modem processor may be integrated in the processor 510. The application processor primarily processes an operating system, user interfaces, application programs, and the like. The modem processor primarily processes radio communication. It can be understood that the modem processor may alternatively be not integrated in the processor 510.

The terminal 500 may further include the power supply 511 (for example, a battery) supplying power to all components. Optionally, the power supply 511 may be logically connected to the processor 510 through a power management system. In this way, functions such as charge management, discharge management, and power consumption management are implemented by using the power management system.

In addition, the terminal 500 includes some functional modules that are not shown. Details are not described herein.

Optionally, an embodiment of this disclosure further provides a terminal, including a processor, a memory, and a computer program stored in the memory and capable of running on the processor. When the computer program is executed by the processor, the processes of the foregoing embodiment of the method for beam failure recovery can be implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the method for beam failure recovery can be implemented, with the same technical effects achieved. To avoid repetition, details are not described herein again. The computer-readable storage medium is, for example, a read-only memory (ROM), a random access memory (RAM), a magnetic disk, or an optical disc.

Figure 6:
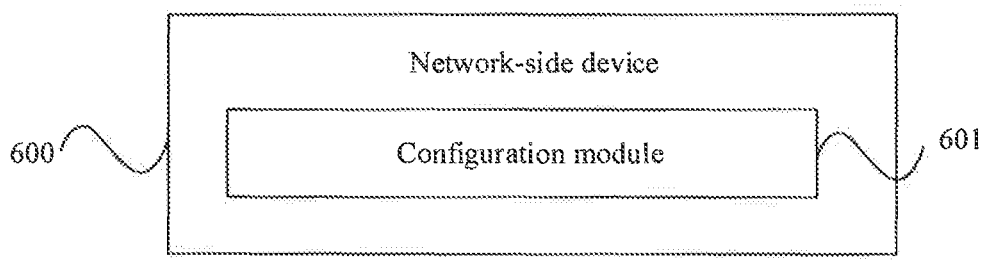
FIG. 6 is a schematic structural diagram of a network-side device according to an embodiment of this disclosure.

As shown in FIG. 6, an embodiment of this disclosure further provides a network-side device 600, including:
  a configuration module 601, configured to configure N pieces of configuration information for a terminal, where the N pieces of configuration information are applicable to different transmission and reception points TRPs, the configuration information includes a parameter for beam failure recovery, and N is an integer greater than 1.

Optionally, in the foregoing embodiment of this embodiment, different TRPs are identified by at least one of the following manners:
  different control resource sets;
  different control resource set groups;
  different explicitly defined TRPs;
  different transmission configuration indicator states;
  different transmission configuration indicator state lists;
  different transmission configuration indicator state pools;
  different quasi co-location QCL;
  different quasi co-location QCL groups;
  different spatial relations;
  different spatial relation groups;
  different physical downlink control channel PDCCH scrambling identifiers;
  different PDCCH scrambling identifier groups;
  different physical downlink shared channel PDSCH scrambling identifiers;
  different PDSCH scrambling identifier groups;
  different PDCCH-Config information elements; or
  different PDSCH-Config information elements.

Optionally, in the foregoing embodiment of this disclosure, the configuration information includes at least one of the following:
  a beam failure detection reference signal;
  a candidate beam reference signal;
  a first resource used for transmitting a beam failure recovery request by the terminal; or
  a second resource used for transmitting a beam failure recovery request response by a network-side device.

Optionally, in the foregoing embodiment of this disclosure, the configuration information of different TRPs satisfies at least one of the following conditions:
  that beam failure detection reference signals are different;
  that candidate beam reference signals are different;
  that first resources used for transmitting a beam failure recovery request by the terminal are different;
  that first resources used for transmitting a beam failure recovery request by the terminal are the same;
  that second resources used for transmitting a beam failure recovery request response by the network-side device are different; or
  that second resources used for transmitting a beam failure recovery request response by the network-side device are the same.

Optionally, in the foregoing embodiment of this disclosure, the configuration module includes:
  a configuration submodule, configured to configure the N pieces of configuration information for the terminal in one bandwidth part BWP.

Optionally, in the foregoing embodiment of this disclosure, the network-side device includes:
  a request receiving module, configured to: if the network-side device is a first TRP with a beam failure event, receive a beam failure recovery request that is transmitted by the terminal based on the configuration information; or if the network-side device is a second TRP other than the first TRP with the beam failure event, receive a beam failure recovery request that is transmitted by the terminal based on the configuration information, and forward the beam failure recovery request to the first TRP.

Optionally, in the foregoing embodiment of this disclosure, the network-side device further includes:
a first receiving module, configured to: in a case that a beam failure event occurs on M TRPs, and first resources, used for transmitting a beam failure recovery request by the terminal, in configuration information of the M TRPs are different, receive a beam failure recovery request that is transmitted by the terminal to each of the M TRPs with the beam failure event by using different first resources in the configuration information of the M TRPs, where M is an integer greater than 1.

Optionally, in the foregoing embodiment of this disclosure, the network-side device further includes:
a second receiving module, configured to: in a case that a beam failure event occurs on M TRPs, and first resources, used for transmitting a beam failure recovery request by the terminal, in configuration information of the M TRPs are the same, receive a beam failure recovery request that is transmitted by the terminal to a higher-priority TRP in the M TRPs with the beam failure event by using the first resource in the configuration information of the M TRPs, where M is an integer greater than 1.

Optionally, in the foregoing embodiment of this disclosure, the network-side device further includes:
a second transmitting module, configured to: in a case that a beam failure event occurs on M TRPs, and second resources, used for transmitting a beam failure recovery request response by a network-side device, in configuration information of the M TRPs are the same, transmit, for a higher-priority TRP in the M TRPs, a beam failure recovery request response to the terminal by using the second resource in the configuration information of the TRP, where M is an integer greater than 1.

Optionally, in the foregoing embodiment of this disclosure, the second resource, used for transmitting a beam failure recovery request response by the network-side device, in the configuration information includes:
a control resource set for beam failure recovery CORESET-BFR.

Optionally, in the foregoing embodiment of this disclosure, the priority of the TRP is determined based on at least one of the following information:
index information of a control resource set;
index information of a control resource set group;
identification information of an explicitly defined TRP;
information about a transmission configuration indicator state;
information about a transmission configuration indicator state list;
information about a transmission configuration indicator state pool;
quasi-co-location QCL information;
quasi-co-location QCL group information;
spatial relation information;
spatial relation group information;
PDCCH scrambling identifier information;
PDCCH scrambling identifier group information;
PDSCH scrambling identifier information;
PDSCH scrambling identifier group information;
information about a PDCCH-Config information element; or
information about a PDSCH-Config information element.

Optionally, in the foregoing embodiment of this disclosure, the network-side device further includes:
a third receiving module, configured to: receive, by using determined spatial relation information, a PUCCH that is transmitted within a preset period of time by the terminal satisfying a preset condition.

Optionally, in the foregoing embodiment of this disclosure, the third receiving module includes:
a first receiving submodule, configured to: skip transmitting downlink information after receiving the beam failure recovery request transmitted by the terminal; and receive, by using the determined spatial relation information, the PUCCH that is transmitted within the preset period of time by the terminal satisfying the preset condition.

Optionally, in the foregoing embodiment of this disclosure, the third receiving module includes:
a second receiving submodule, configured to: transmit downlink information after receiving the beam failure recovery request transmitted by the terminal; and receive, by using the determined spatial relation information, the PUCCH that is transmitted within the preset period of time by the terminal satisfying the preset condition.

Optionally, in the foregoing embodiment of this disclosure, the determined spatial relation information is: spatial relation information of a PUCCH associated with the TRP with the beam failure event.

Optionally, in the foregoing embodiment of this disclosure, the network-side device further includes:
a second information determining module, configured to determine, in one of the following manners, the spatial relation information of the PUCCH associated with the TRP with the beam failure event:
using spatial relation information of an uplink channel for transmitting a beam failure recovery request in a preset cell;
using spatial relation information or QCL information of a preset channel in the preset cell;
using spatial relation information or QCL information of a preset reference signal in the preset cell;
using spatial relation information or QCL information of a preset channel in a primary cell; or
using spatial relation information or QCL information of a preset reference signal in the primary cell.

Optionally, in the foregoing embodiment of this disclosure, the preset condition is at least one of the following:
the terminal receives downlink information that is transmitted by the TRP with the beam failure event;
the terminal transmits a beam failure recovery request to the TRP with the beam failure event; or
the terminal transmits a beam failure recovery request to the TRP with the beam failure event, and does not receive, within a first preset duration, downlink information transmitted by the TRP with the beam failure event.

Optionally, in the foregoing embodiment of this disclosure, the downlink information includes at least one of the following:
a PDCCH on a control resource set for beam failure recovery CORESET-BFR associated with the TRP with the beam failure event;
downlink control information DCI;

a random access response RAR;

a release command or deactivation command used for releasing a cell with a beam failure;

information triggering beam measurement and/or beam reporting for the TRP with the beam failure event;

information triggering channel state information CSI measurement and/or CSI reporting for the TRP with the beam failure event; or acknowledgement ACK or negative acknowledgement NACK corresponding to scheduling information of the TRP with the beam failure event.

Optionally, in the foregoing embodiment of this disclosure, the preset period of time starts:

when the preset condition is satisfied; or when a second preset duration elapses after the preset condition is satisfied.

The network-side device provided in this embodiment of this disclosure is capable of implementing processes that are implemented by the network-side device in the method embodiment of FIG. 3. To avoid repetition, details are not described herein again.

In summary, in this embodiment of this disclosure, the network configures, for the terminal, N pieces of configuration information applicable to different TRPs, so that a beam of each TRP can be quickly restored in case of a beam failure event, thereby resolving a beam failure recovery problem in a multi-TRP scenario.

It should be noted that the network-side device provided in this embodiment of this disclosure is a network-side device capable of executing the foregoing method for beam failure handling, and all embodiments of the foregoing method for beam failure handling are applicable to the network-side device, with the same or similar beneficial effects achieved.

Optionally, an embodiment of this disclosure further provides a network-side device, including a processor, a memory, and a computer program stored in the memory and capable of running on the processor. When the computer program is executed by the processor, the processes of the foregoing embodiment of the method for beam failure handling can be implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the method for beam failure handling can be implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for beam failure recovery, comprising:

obtaining, by a terminal, N pieces of configuration information, wherein the N pieces of configuration information are applicable to different transmission and reception points (TRPs), the configuration information comprises a parameter for beam failure recovery, and N is an integer greater than 1; and in a case that a beam failure event occurring on at least one TRP is determined, transmitting, by the terminal, a beam failure recovery request based on the configuration information;

wherein in a case that a beam failure event occurs on M TRPs, and first resources, used for transmitting a beam failure recovery request by the terminal, in configuration information of the M TRPs are the same, wherein M is an integer greater than 1, the transmitting a beam failure recovery request based on the configuration information comprises:

transmitting a beam failure recovery request to a higher-priority TRP in the M TRPs with the beam failure event by using the first resource in the configuration information of the M TRPS;

wherein a priority of the TRP is determined based on spatial relation information.

2. The method according to claim 1, wherein different TRPs are identified by at least one of the following manners:

different control resource sets;

different control resource set groups;

different explicitly defined TRPs;

different transmission configuration indicator states;

different transmission configuration indicator state lists;

different transmission configuration indicator state pools;

different quasi co-location (QCL);

different quasi co-location (QCL) groups;

different spatial relations;
different spatial relation groups;
different physical downlink control channel (PDCCH) scrambling identifiers;
different PDCCH scrambling identifier groups;
different physical downlink shared channel (PDSCH) scrambling identifiers;
different PDSCH scrambling identifier groups;
different PDCCH-Config information elements; or
different PDSCH-Config information elements.

3. The method according to claim 1, wherein the configuration information comprises at least one of the following:
a beam failure detection reference signal;
a candidate beam reference signal;
a first resource used for transmitting a beam failure recovery request by the terminal; or
a second resource used for transmitting a beam failure recovery request response by a network-side device.

4. The method according to claim 3, wherein configuration information of different TRPs satisfies at least one of the following conditions:
that beam failure detection reference signals are different;
that candidate beam reference signals are different;
that first resources used for transmitting a beam failure recovery request by the terminal are different;
that first resources used for transmitting a beam failure recovery request by the terminal are the same;
that second resources used for transmitting a beam failure recovery request response by the network-side device are different; or
that second resources used for transmitting a beam failure recovery request response by the network-side device are the same.

5. The method according to claim 1, wherein the obtaining N pieces of configuration information comprises:
obtaining the N pieces of configuration information that are configured by a network-side device in one bandwidth part (BWP).

6. The method according to claim 1, wherein in a case that a beam failure event occurs on a first TRP, the transmitting a beam failure recovery request based on the configuration information comprises:
transmitting a beam failure recovery request to the first TRP based on a first resource, used for transmitting a beam failure recovery request by the terminal, in configuration information corresponding to the first TRP; or
transmitting a beam failure recovery request to a second TRP based on a first resource, used for transmitting a beam failure recovery request by the terminal, in configuration information corresponding to the second TRP other than the first TRP, wherein the beam failure recovery request is forwarded to the first TRP by the second TRP.

7. The method according to claim 1, wherein in a case that a beam failure event occurs on M TRPs, and first resources, used for transmitting a beam failure recovery request by the terminal, in configuration information of the M TRPs are different, wherein M is an integer greater than 1,
the transmitting a beam failure recovery request based on the configuration information comprises:
transmitting a beam failure recovery request to each of the M TRPs with the beam failure event by using different first resources in the configuration information of the M TRPs; and/or
wherein in a case that a beam failure event occurs on M TRPs, and second resources, used for transmitting a beam failure recovery request response by a network-side device, in configuration information of the M TRPs are the same, wherein M is an integer greater than 1, the method further comprises:
receiving a beam failure recovery request response that is transmitted by a higher-priority TRP in the M TRPs with the beam failure event by using the second resource in the configuration information.

8. The method according to claim 7, wherein the second resource, used for transmitting a beam failure recovery request response by the network-side device, in the configuration information comprises:
a control resource set for beam failure recovery (CORESET-BFR).

9. The method according to claim 1, wherein a priority of the TRP is further determined based on at least one of the following information:
index information of a control resource set;
index information of a control resource set group;
identification information of an explicitly defined TRP;
information about a transmission configuration indicator state;
information about a transmission configuration indicator state list;
information about a transmission configuration indicator state pool;
quasi-co-location (QCL) information;
quasi-co-location (QCL) group information;
PDCCH scrambling identifier information;
PDCCH scrambling identifier group information;
PDSCH scrambling identifier information;
PDSCH scrambling identifier group information;
information about a PDCCH-Config information element; or
information about a PDSCH-Config information element.

10. The method according to claim 1, further comprising:
if a preset condition is satisfied, transmitting, by the terminal by using spatial relation information of a PUCCH associated with a TRP with a beam failure event, the PUCCH within a preset period of time.

11. The method according to claim 10, wherein the preset condition is at least one of the following:
the terminal receives downlink information that is transmitted by the TRP with the beam failure event;
the terminal transmits a beam failure recovery request to the TRP with the beam failure event; or
the terminal transmits a beam failure recovery request to the TRP with the beam failure event, and does not receive, within a first preset duration, downlink information transmitted by the TRP with the beam failure event; and/or
wherein the preset period of time starts:
when the preset condition is satisfied; or
when a second preset duration elapses after the preset condition is satisfied; and/or
wherein the spatial relation information of the PUCCH associated with the TRP with the beam failure event is determined in one of the following manners:
using spatial relation information of an uplink channel for transmitting a beam failure recovery request in a preset cell;
using spatial relation information or QCL information of a preset channel in the preset cell;
using spatial relation information or QCL information of a preset reference signal in the preset cell;
using spatial relation information or QCL information of a preset channel in a primary cell; or using spatial relation information or QCL information of a preset reference signal in the primary cell.

12. The method according to claim 1, further comprising:
skipping transmitting a PUCCH in a case that after transmitting a beam failure recovery request to a TRP with a beam failure event, the terminal does not receive, within a third preset duration, downlink information that is transmitted by the TRP with the beam failure event.

13. The method according to claim 12, wherein the downlink information comprises at least one of the following:
a PDCCH on a control resource set for beam failure recovery (CORESET-BFR) associated with the TRP with the beam failure event;
downlink control information (DCI);
a random access response (RAR);
a release command or deactivation command used for releasing a cell with a beam failure;
information triggering beam measurement and/or beam reporting for the TRP with the beam failure event;
information triggering channel state information (CSI) measurement and/or CSI reporting for the TRP with the beam failure event; or
acknowledgement (ACK) or negative acknowledgement (NACK) corresponding to scheduling information of the TRP with the beam failure event.

14. A terminal, comprising a processor, a memory, and a computer program stored in the memory and capable of running on the processor, wherein the computer program is executed by the processor to implement:
obtaining N pieces of configuration information, wherein the N pieces of configuration information are applicable to different transmission and reception points (TRPs), the configuration information comprises a parameter for beam failure recovery, and N is an integer greater than 1; and
in a case that a beam failure event occurring on at least one TRP is determined, transmitting a beam failure recovery request based on the configuration information;
wherein in a case that a beam failure event occurs on M TRPs, and first resources, used for transmitting a beam failure recovery request by the terminal, in configuration information of the M TRPs are the same, wherein M is an integer greater than 1,
the transmitting a beam failure recovery request based on the configuration information comprises:
transmitting a beam failure recovery request to a higher-priority TRP in the M TRPs with the beam failure event by using the first resource in the configuration information of the M TRPs;
wherein a priority of the TRP is determined based on spatial relation information.

15. The terminal according to claim 14, wherein different TRPs are identified by at least one of the following manners:
different control resource sets;
different control resource set groups;
different explicitly defined TRPs;
different transmission configuration indicator states;
different transmission configuration indicator state lists;
different transmission configuration indicator state pools;
different quasi co-location (QCL);
different quasi co-location (QCL) groups;
different spatial relations;
different spatial relation groups;
different physical downlink control channel (PDCCH) scrambling identifiers;
different PDCCH scrambling identifier groups;
different physical downlink shared channel (PDSCH) scrambling identifiers;
different PDSCH scrambling identifier groups;
different PDCCH-Config information elements; or
different PDSCH-Config information elements.

16. The terminal according to claim 14, wherein the configuration information comprises at least one of the following:
a beam failure detection reference signal;
a candidate beam reference signal;
a first resource used for transmitting a beam failure recovery request by the terminal; or
a second resource used for transmitting a beam failure recovery request response by a network-side device.

17. The terminal according to claim 16, wherein configuration information of different TRPs satisfies at least one of the following conditions:
that beam failure detection reference signals are different;
that candidate beam reference signals are different;
that first resources used for transmitting a beam failure recovery request by the terminal are different;
that first resources used for transmitting a beam failure recovery request by the terminal are the same;
that second resources used for transmitting a beam failure recovery request response by the network-side device are different; or
that second resources used for transmitting a beam failure recovery request response by the network-side device are the same.

18. The terminal according to claim 14, wherein the computer program is further executed by the processor to implement:
obtaining the N pieces of configuration information that are configured by a network-side device in one bandwidth part (BWP).

19. The terminal according to claim 14, wherein in a case that a beam failure event occurs on a first TRP, the computer program is further executed by the processor to implement:
transmitting a beam failure recovery request to the first TRP based on a first resource, used for transmitting a beam failure recovery request by the terminal, in configuration information corresponding to the first TRP; or
transmitting a beam failure recovery request to a second TRP based on a first resource, used for transmitting a beam failure recovery request by the terminal, in configuration information corresponding to the second TRP other than the first TRP, wherein the beam failure recovery request is forwarded to the first TRP by the second TRP.

20. A network-side device, comprising a processor, a memory, and a computer program stored in the memory and capable of running on the processor, wherein the computer program is executed by the processor to implement:
obtaining N pieces of configuration information, wherein the N pieces of configuration information are applicable to different transmission and reception points (TRPs), the configuration information comprises a parameter for beam failure recovery, and N is an integer greater than 1; and
in a case that a beam failure event occurring on at least one TRP is determined, transmitting a beam failure recovery request based on the configuration information;

wherein in a case that a beam failure event occurs on M TRPs, and first resources, used for transmitting a beam failure recovery request by the terminal, in configuration information of the M TRPs are different, wherein M is an integer greater than 1, the method further comprises:

receiving a beam failure recovery request that is transmitted by the terminal to a higher-priority TRP in the M TRPs with the beam failure event by using the first resource in the configuration information of the M TRPs;

wherein a priority of the TRP is determined based on spatial relation information.

* * * * *